(12) United States Patent
Kawamoto et al.

(10) Patent No.: US 8,363,064 B2
(45) Date of Patent: Jan. 29, 2013

(54) IMAGE PROCESSING APPARATUS, IMAGE PROCESSING SYSTEM, IMAGE PROCESSING METHOD, AND COMPUTER-READABLE MEDIUM

(75) Inventors: Koushi Kawamoto, Kanagawa (JP); Hitoshi Abe, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 805 days.

(21) Appl. No.: 12/058,031

(22) Filed: Mar. 28, 2008

(65) Prior Publication Data

US 2009/0085932 A1    Apr. 2, 2009

(30) Foreign Application Priority Data

Sep. 28, 2007    (JP) .................... 2007-253761

(51) Int. Cl.
G06G 5/00    (2006.01)
G06K 9/36    (2006.01)
G06F 17/00    (2006.01)
G06F 3/048    (2006.01)

(52) U.S. Cl. ........ 345/619; 345/629; 382/286; 715/243; 715/788

(58) Field of Classification Search .......... 345/619, 345/629, 634, 635, 647, 660, 661, 670, 672, 345/676; 382/286–301; 715/244–253, 273–277, 715/764, 767, 781, 788–801

See application file for complete search history.

(56) References Cited

U.S. PATENT DOCUMENTS 5,630,040 A * 5/1997 Furuya .......................... 345/666
6,466,954 B1 10/2002 Kurosawa et al.
7,703,011 B2 * 4/2010 Yamakado et al. .......... 715/243
2007/0074109 A1 3/2007 Nagahara et al.

FOREIGN PATENT DOCUMENTS

| JP | 07-065059 A | 3/1995 |
|---|---|---|
| JP | 11-272871 A | 10/1999 |
| JP | 2003-348334 A | 12/2003 |
| JP | 2004-178002 A | 6/2004 |
| JP | 2007-172573 A | 7/2007 |

OTHER PUBLICATIONS

Fenczik et al.. (1999). Flash 4: Using Flash. San Francisco: Macromedia, Inc.*
Office Action issued Mar. 6, 2012 in corresponding Japanese Application No. 2007-253761.
Communication, dated Dec. 6, 2011, issued by the Japanese Patent Office in corresponding Japanese Application No. 2007-253761.

* cited by examiner

*Primary Examiner* — James A Thompson
*Assistant Examiner* — Jed-Justin Imperial
(74) *Attorney, Agent, or Firm* — Sughrue Mion, PLLC

(57) ABSTRACT

An image processing apparatus includes a receiving unit, an image-element group determining unit and a shape changing unit. The receiving unit receives (i) a command to form a blank space and (ii) information specifying a position where the blank space is to be formed in a drawing space for displaying a drawn image. The image-element group determining unit determines, as an image-element group, image elements having a predetermined relation with each other and being drawn in the drawing space. The shape changing unit performs a shape changing process collectively for the image elements of image-element group. The shape changing process includes at least one of (i) a process of moving image elements of the image-element group so as to move the image-element group away from the specified position where the blank space is to be formed, and (ii) a process of reducing the image elements of the image-element group

4 Claims, 9 Drawing Sheets

| IMAGE ELEMENT | TIME |
|---|---|
| (x1a, y1a), (x1b, y1b), ⋯ | tttt |
| ⋮ | ⋮ |

IMAGE PROCESSING APPARATUS, IMAGE PROCESSING SYSTEM, IMAGE PROCESSING METHOD, AND COMPUTER-READABLE MEDIUM

CROSS-REFERENCE TO RELATED APPLICATIONS

This application is based on and claims priority under 35 U.S.C. §119 from Japanese Patent Application No. 2007-253761 filed on Sep. 28, 2007.

BACKGROUND

1. Technical Field

The invention relates to an image processing apparatus, an image processing system, an image processing method, and a computer-readable medium.

2. Related Art

A device for processing a manually-drawn image into an electronic image, such as an electronic blackboard, is also known.

In an apparatus that accepts drawing of an image in a single drawing space, if many images are drawn in the drawing space and if no blank space remains, a blank space can be created only by deleting the images already drawn. Accordingly, there is a demand for a technology of creating a blank space without deleting images already drawn.

SUMMARY

According to an aspect of the invention, an image processing apparatus includes a receiving unit, an image-element group determining unit and a shape changing unit. The receiving unit receives (i) a command to form a blank space and (ii) information specifying a position where the blank space is to be formed in a drawing space for displaying a drawn image. The image-element group determining unit determines, as an image-element group, image elements having a predetermined relation with each other and being drawn in the drawing space. The shape changing unit performs a shape changing process collectively for the image elements of the image-element group. The shape changing process includes at least one of (i) a process of moving the image elements of the image-element group so as to move the image-element group away from the specified position where the blank space is to be formed, and (ii) a process of reducing the image elements of the image-element group.

BRIEF DESCRIPTION OF THE DRAWINGS

Exemplary embodiments of the invention will be described in detail below with reference to the accompanying drawings, wherein.

DETAILED DESCRIPTION

An exemplary embodiment of the invention will be described with reference to the drawings. It is noted that although FIGS. 4, 5, 7, 8 and 10 include Japanese letters, those letters are shown as examples of drawn images and therefore are not translated into English.

Figures 1, 2:
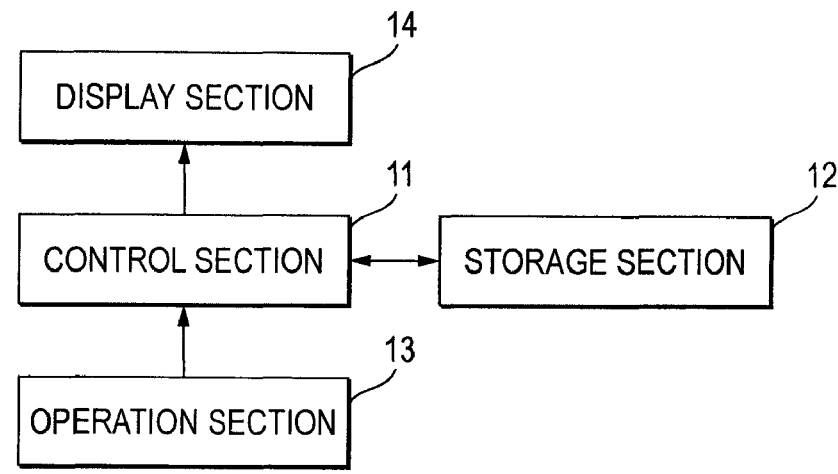
FIG. 1 is a configuration block diagram illustrating an image processing apparatus according to an exemplary embodiment of the invention.
FIG. 2 is an explanatory diagram illustrating an example of image elements stored in the image processing apparatus according to the exemplary embodiment of the invention.

An image processing apparatus according to this exemplary embodiment is configured to include a control section 11, a storage section 12, an operation section 13, and a display section 14, as shown in FIG. 1.

Here, the control section 11 is a program-controlling device such as a CPU (Central Processing Unit) and operates in accordance with a program stored in the storage section 12. The control section 11 receives a drawing command input from the operation section 13 and generates an image to be drawn in accordance with the drawing command. Then, the control section 11 displays the generated image on the display section 14. When receiving a command to form a blank space in images displayed on the display section 14 from a user, the control section 11 forms the blank space by performing a predetermined process for the images already drawn, in accordance with the command. Details of the process performed by the control section 11 will be described later.

The storage section 12 is configured to include a RAM (Random Access Memory). The programs to be executed by the control section 11 are stored in the storage section 12. The programs may be provided in such a form that the programs are stored in a DVD-ROM as a computer-readable recording medium, and may be then copied into the storage section 12.

The operation section 13 may be a mouse and/or a keyboard, or may be a device for detecting a user's manual writing operation on the display section 14. Here, when the display section 14 is a liquid crystal monitor or a plasma display device, the device for detecting the manual writing operation may be a transparent pen tablet disposed on a display screen, for example. Alternatively, when the display section 14 includes a projector and a screen, the device for detecting the manual writing operation may be a pen tablet disposed on a screen or a device for detecting a pen's movement on the screen to receive a manually-drawn image.

The display section 14 may be a display or a projector and serves to display images in accordance with a command input from the control section 11. The display section 14 displays images, which are generated by the control section 11 in accordance with the drawing command. A portion of the display section 14 that displays the images is a drawing space. In other words, the drawing space is a data expression system (coordinate system) in a specific device group.

Here, processes executed by the control section 11 will be described. The control section 11 receives a drawing command from a user through the operation section 13. The control section 11 generates an image in accordance with the drawing command and displays the generated image on the display section 14.

The control section 11 stores information of the generated image in the storage section 12. For example, when receiving a command to draw a line segment as the drawing command, the control section 11 may acquire coordinate information to draw the line segment. The coordinate information may include control points for a Bézier curve. Since a process of converting a manually-drawn image into a Bézier curve is widely known, detailed description thereof is omitted here.

Whenever an image is drawn, the control section 11 stores information indicating each drawing result (referred to as an "image element") in the storage section 12. At the time of storing each image element, the control section 11 may acquire time information at the storing time point from a timer (not shown). Then, the control section 11 may store the acquired time information in association with each image element. As a result, the individual image elements are stored in the storage section 12 along with the information indicating the corresponding drawing time points, as shown in FIG. 2.

In another method, the control section 11 may store the images, which are drawn in accordance with the drawing commands, as bitmap images. In this case, the control section 11 calculates coordinates of a circumscribed rectangle circumscribing each image drawn by the user and stores coordinates of a predetermined point (for example, coordinates of the vertex at the upper-left corner) of each circumscribed rectangle and the corresponding bitmap image included in the circumscribed rectangle, as an image element. In this case, time information indicating a drawing time point may be stored in association with each image element.

Figure 3:
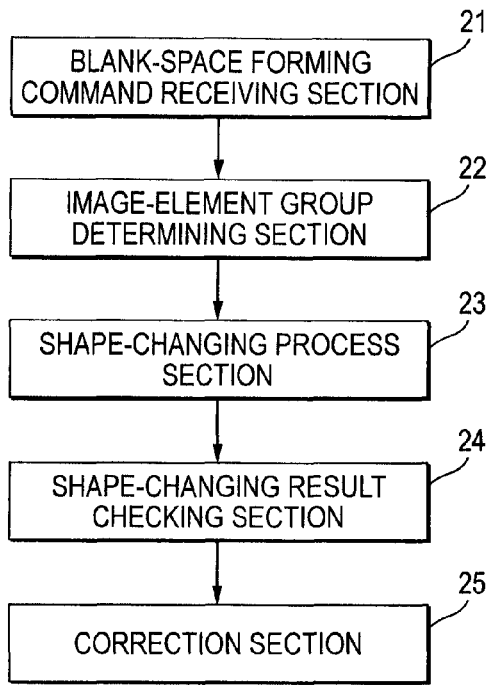
FIG. 3 is a functional block diagram illustrating an image processing apparatus according to the exemplary embodiment of the invention.

Next, a blank-space forming process performed by the control section 11 according to this exemplary embodiment will be described. A blank-space forming program executed by the control section 11 functionally includes a blank-space forming command receiving section 21, an image-element group determining section 22, a shape-changing process section 23, a shape-changing result checking section 24, and a correction section 25, as shown in FIG. 3.

The blank-space forming command receiving section 21 receives, from the user, a command to form a blank space along with information indicating a position where the blank space is to be formed (may be referred to as a "blank-space forming position"). This command may be defined as an operation of a pen or a keyboard in advance. When this operation defined in advance is performed, it may be considered that the blank-space forming command is received and the blank-space forming process may be advanced. The blank-space forming position may be a single point in the drawing space of the display section 14 or may be a region having an area in the drawing space of the display section 14.

The image-element group determining section 22 classifies image elements stored in the storage section 12 into groups (image-element groups). The image-element group determining section 22 groups image elements having a predetermined relation with each other, among the image elements stored in the storage section 12. This relation may be, for example, a relation of intersection or a relation of inclusion. For example, the image-element group determining section 22 calculates circumscribed rectangles that circumscribe the image elements. Then, the image-element group determining section 22 groups the image elements having the circumscribed rectangles at least part of which are overlapped with each other.

The image-element group determining section 22 issues a group identifier that is unique to each classified group, and stores each image element in the storage section 12 in association with a group identifier indicating a group to which each image element belongs.

The shape-changing process section 23 performs a shape changing process for the image elements collectively, in units of groups. The shape changing process includes at least one of (i) a process of moving the groups away from the specified blank-space forming position and (ii) a process of reducing the groups.

Figure 4:
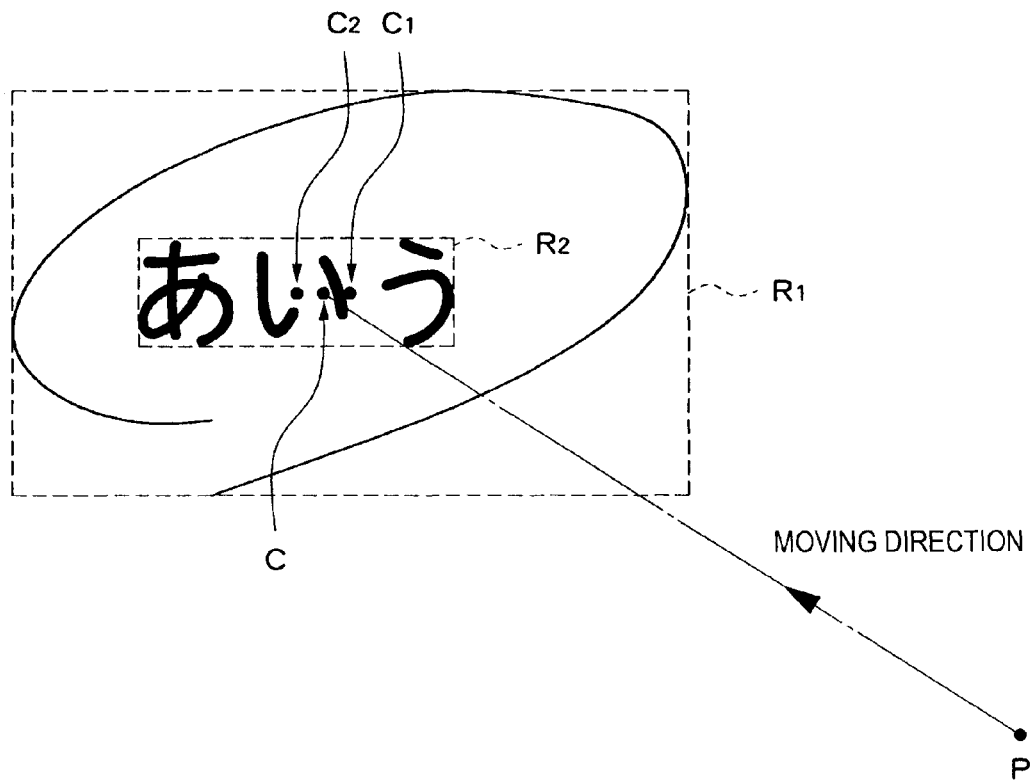
FIG. 4 is an explanatory diagram illustrating a circumscribed rectangle of an image element used in the image processing apparatus according to the exemplary embodiment of the invention.
Figure 5:
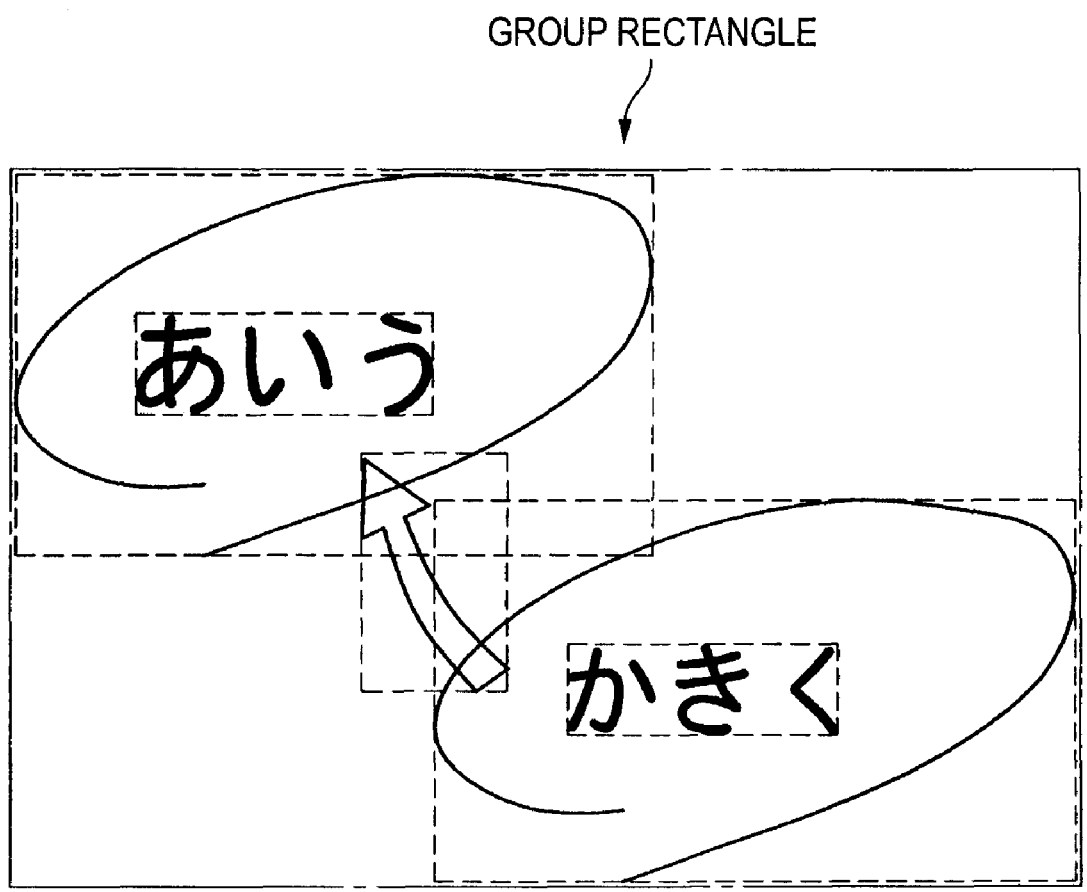
FIG. 5 is an explanatory diagram illustrating a group rectangle used in the image processing apparatus according to the exemplary embodiment of the invention.

The moving process is performed, for example, as follows. In the moving process, the image elements belonging to each group are moved in parallel to get away from a position specified as the blank-space forming position. For example, as shown in FIG. 4, a center position Ci (where i=1, 2, ...) of a circumscribed rectangle Ri (where i=1, 2, ...) of each image element is calculated and then, an average position C of the center positions Ci is calculated. Next, a coordinate of a new center position C' (C'x, C'y) is calculated by the following expression, using the coordinate of the average position C(Cx, Cy) and the coordinate of the specified position P(Px, Py) where the blank space is to be formed.

$$(C'x, C'y) = \alpha \cdot \{(Cx, Cy) - (Px, Py)\} + (Cx, Cy)$$

where α denotes a parameter corresponding to a change quantity and may be a predetermined value or may be a value that decreases as the number of groups increase (for example, a value proportional to exp[−N] ("exp" denotes an exponential function for the number of groups N). The shape-changing process section 23 may set the parameter a in the following manner. That is, the shape-changing process section 23 selects the latest time from among the information indicating the drawing times, which are associated with the image elements belonging to each group, and sets the selected time as a representative time Tr. Then, the shape-changing process section 23 acquires a process time Tp, at which the shape changing process is performed, from the timer (not shown), and sets the parameter α so that the moving distance increases as a difference Tp−Tr increases. Alternatively, the parameter α may be set so that the moving distance increases as the average position C of the image elements and the position P at which the blank space is to be formed get closer to each other. For example, the parameter α may be set to a value inversely proportional to the distance between the points C and P. That is, $$\alpha = \frac{k}{\sqrt{(C_x - P_x)^2 + (C_y - P_y)^2}}$$

where k denotes a constant value determined based on a screen size.

The shape-changing process section 23 moves the image elements belonging to this group in parallel by {(C'x, C'y)−(Cx, Cy)}.

Also, when the blank-space forming position is specified as a region, the shape-changing process section 23 may move the image elements belonging to each group in steps of a certain quantity (distance) in a vector direction specified by {(Cx, Cy)−(Px, Py)} until all the image elements of each group are not included in the specified region.

The blank-space forming position may be specified in the following manner. For example, a user first sets a size of a rectangle region. Then, a position where the user places the pen on the screen of the display section 14 (or on the tablet or the like) is set as a lower right position or a center of the rectangle region. The blank space is formed in the set rectangle region. The set lower right position or center of the rectangle region serves as the blank-space forming position.

The shape of the blank space is not limited to a rectangle shape, but may be any shape. For example, a drawing operation that is performed within a given period of time may be recognized as continuation drawing. A rectangle (Bounding-Box) that circumscribes the continually-drawn image (manually drawn image) is set as an input region. Then, a position where the user places the pen on the screen of the display section 14 is set as a lower right position or a center of the input region. The blank space is formed in the input region (circumscribing rectangle). The set lower right position or center of the rectangle region serves as the blank-space forming position.

Alternatively, when the user places the pen on the screen of the display section 14, a circle about the position where the pen is placed may be formed and enlarged up to a radius R unless the pen detaches from the screen of the display section 14. In other words, when the user detaches the pen from the screen, it is stopped to enlarge the circle and the radius of the formed circle is determined. Then, the blank space is formed in the formed circle. The center of the formed circle serves as the blank-space forming position.

The reducing process is performed, for example, as follows. The shape-changing process section 23 defines a rectangle (referred to as a "group rectangle") including the image elements of each group. For example, the group rectangle may be a rectangle (FIG. 5) circumscribing a figure obtained by synthesizing circumscribed rectangles of the respective image elements in a logical sum manner. If the image elements of each group are represented by a single bitmap, each defined group rectangle is a rectangle circumscribing the corresponding bitmap.

The shape-changing process section 23 selects one coordinate most apart from the blank-space forming position from among the vertex coordinates of each group rectangle. Using the selected coordinate as a target position T(Tx, Ty), the shape-changing process section 23 reduces the image elements of each group, toward the target position T, at a separately defined reduction ratio β common to the groups. For example, when the image elements are expressed by vector information such as a Bézier curve, coordinates of control points in the vector information are moved to a coordinate S'(S'x, S'y)=β·{(Sx, Sy)−(Tx, Ty)}+(Tx, Ty), where S(Sx, Sy) denotes an original coordinate.

The shape-changing process section 23 may perform the reducing process as follows. That is, the image elements of each group are converted into a single bitmap image and a rectangle circumscribing the bitmap image is defined. Then, the shape-changing process section 23 selects one coordinate most apart from the blank-space forming position from among the vertex coordinates of this rectangle. Using the selected coordinate as a fixed point, the shape-changing process section 23 reduces the bitmap image toward the fixed point at the reduction ratio β.

The reduction ratio β may be determined as a constant value in advance or may be set so that the reduction ratio increases as a distance between the position P specified as the blank-space forming position and the selected position T increases. The shape-changing process section 23 may select the latest time from the information indicating the drawing times, which are associated with the image elements of each group; set the selected time as a representative time Tr; acquire a time Tp at which the shape changing process is performed from the timer (not shown); and set the reduction ratio β so that the reduction ratio β increases as a difference Tp−Tr increases.

For each group subjected to the shape changing process, the shape-changing result checking section 24 checks as to whether circumscribed rectangles (or rectangles circumscribing respective bitmaps when the image elements of each group are converted into a single bitmap in the shape changing process) of the image elements belonging to different groups are overlapped with each other. If it is determined that the circumscribed rectangles of the image elements belonging to the different groups are overlapped with each other, information (group identifier) specifying the groups in question is output to the correction section 25.

When receiving the information (group identifiers) specifying the groups in question from the shape-changing result checking section 24, the shape changing process section 23 further performs a reducing process for the groups corresponding to the received information (group identifiers). In this case, using the centers of the group rectangles in question (or the centers of rectangles circumscribing respective bitmaps when the image elements of each group are converted into a single bitmap) as a fixed point, the correction section 25 performs the reducing process toward the fixed point. The correction section 25 causes the shape-changing result checking section 24 to perform a check process while reducing Δ by Δβ (Δβ is a predetermined value), until the circumscribed rectangles of the image elements belonging to the different groups in question are not overlapped with each other.

The correction section 25 may select a group having a center of a group rectangle (or a center of a rectangle circumscribing a bitmap when the image elements of each group are converted into a single bitmap) that is the most apart from the position input as the blank-space forming position among the centers of the group rectangles specified by the input information (input group identifiers). Then, the correction section 25 moves the image elements of the selected group in parallel in a direction in which the selected group gets apart from the blank-space forming position until the circumscribed rectangles of the image elements belonging to the different groups in question are not overlapped with each other.

In the above description, it is checked as to whether the image elements are overlapped with each other using the circumscribed rectangle. However, the method of checking as to whether or not the image elements are overlapped with each other is not limited thereto. For example, outlines of image elements may be extracted, and a set of vectors constituting the outlines may be acquired. Then, the following process may be performed. That is, when at least one of the vectors of the outline of an image element that is a comparison object intersects at least one of the vectors of the outline of an image element in question, it is determined that the image element in question and the image element of the comparison object are overlapped with each other. This determination may be used when the image-element group determining section 22 groups image elements. Also, this determination may be used when the shape-changing result checking section 24 determines as to whether the image elements belonging to different groups are overlapped with each other, after the shape changing process.

Figure 6:
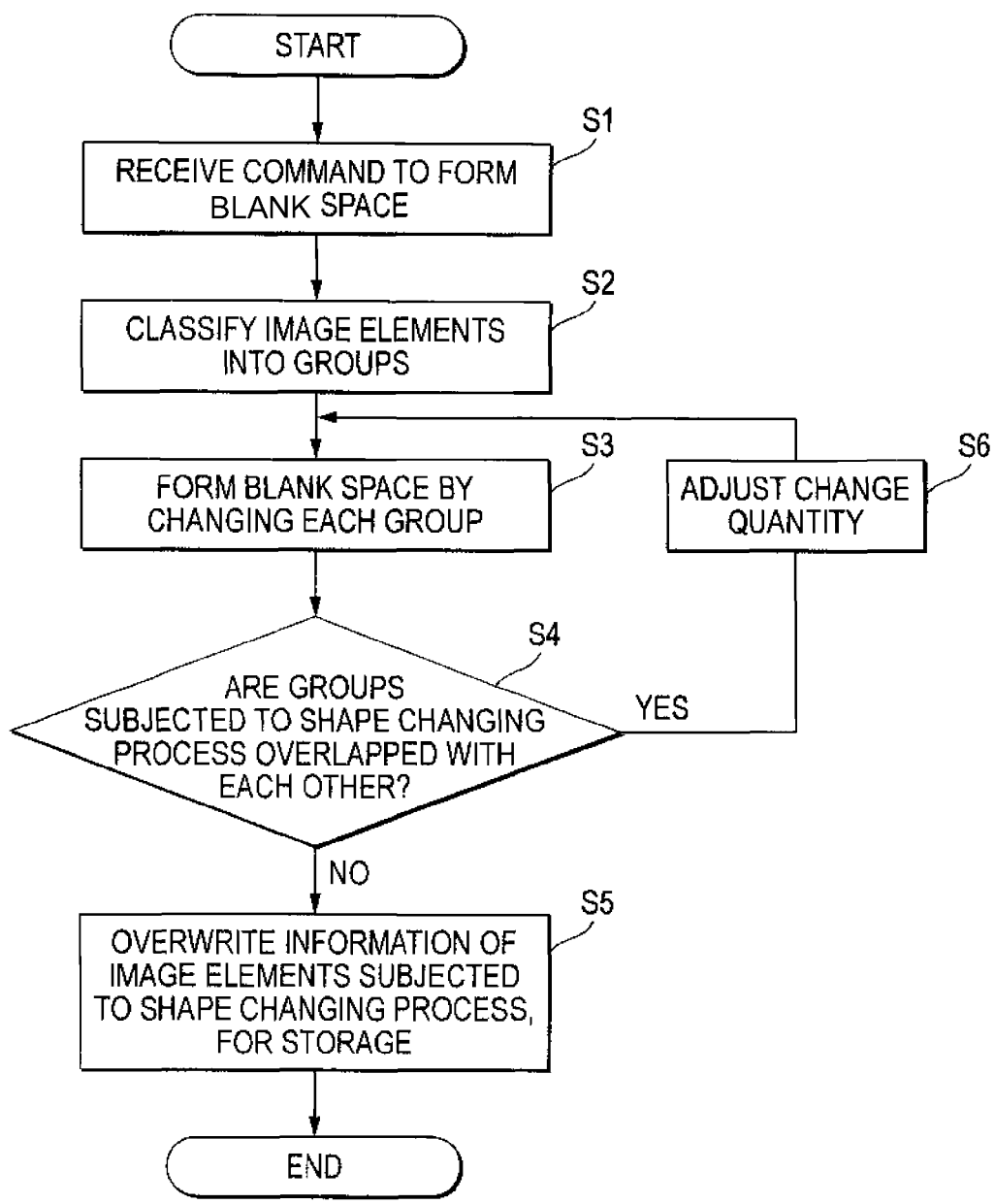
FIG. 6 is a flowchart illustrating processes performed by the image processing apparatus according to the exemplary embodiment of the invention.

As shown in FIG. 6, according to this exemplary embodiment, when a command to form a blank space is given (S1), the control section 11 classifies the drawn image elements into groups (S2) and then, performs the shape changing process such as moving or reducing for each group (S3). After the shape changing process, it is determined as to whether different groups are overlapped with each other (S4). When the different groups are not overlapped with each other, the image elements subjected to the shape changing process are overwritten and stored in the storage section 12 (S5) and then the process is ended. At this time, the drawing time information is not changed. When the image elements of each group are converted into a single bitmap, a time at which the latest image element is drawn among the image elements belonging to the group is stored as the drawing time of the converted bitmap.

When it is determined in step S4 that the different groups are overlapped with each other, the reduced quantity or the moving distance (change quantity) is adjusted (S6) and the process of S3 is performed again.

Figure 7A:
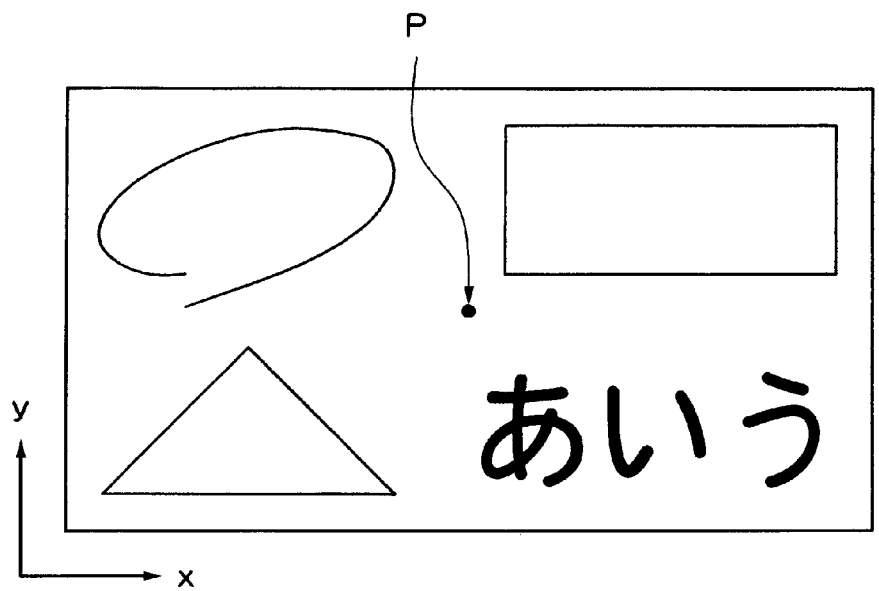
FIG. 7 is an explanatory diagram illustrating an operation example of the image processing apparatus according to the exemplary embodiment of the invention.
Figure 7B:
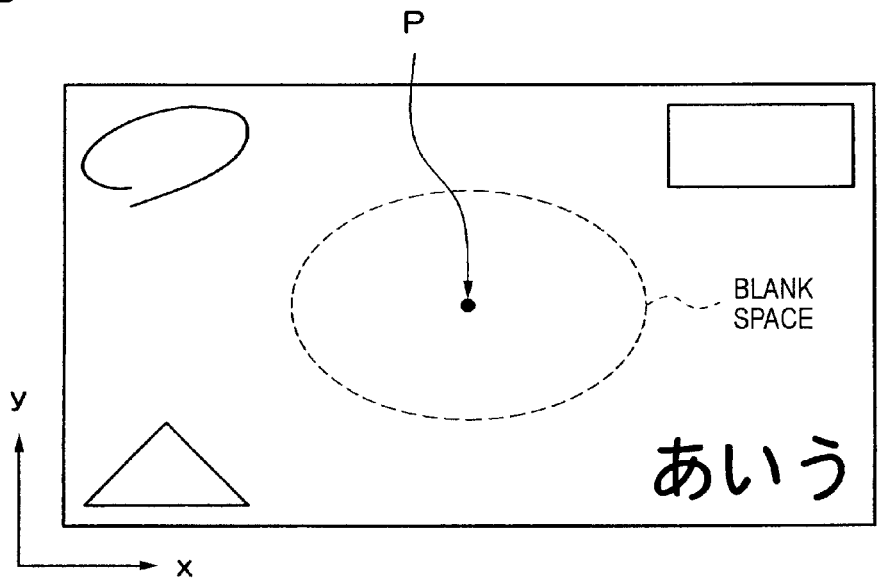

Accordingly, as shown in FIG. 7, even if many image elements exist in a region (drawing space) in which a user can draw an image element by giving a drawing command and if it is difficult to draw a new image element therein (FIG. 7A), when a single point P is specified and a command to form a blank space is given, the image elements having been drawn before are moved or reduced and a blank space is formed around the point P (FIG. 7B).

Furthermore, when an image is drawn in the blank space formed in this way, the control section 11 may detect completion of the drawing and perform a next process. For example, when a user performs an input to the blank space with a pen, the control section 11 may determine that the drawing is completed when a predetermined time has elapsed from the time at which the latest pen input is performed.

Figure 8A:
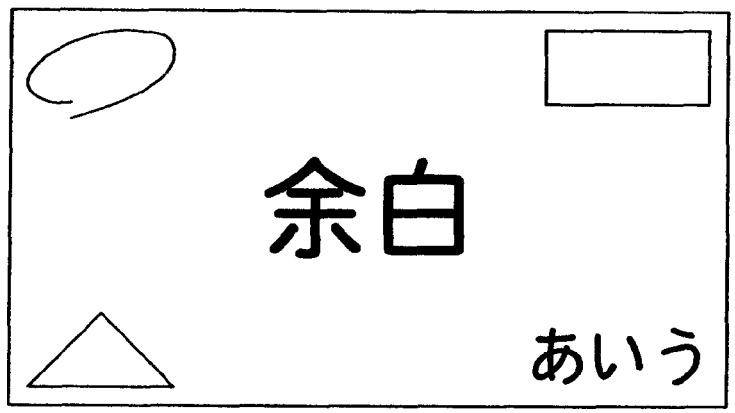
FIG. 8 is an explanatory diagram illustrating another operation example of the image processing apparatus according to the exemplary embodiment of the invention.

That is, the control section 11 performs the blank-space forming process, in the original state (FIG. 7(a)), in accordance with the command (FIG. 7B). Then, the control section 11 performs the next process when drawing of an image is completed in the blank space (FIG. 8A).

When detecting that the drawing of the image is completed, the control section 11 classifies the image elements drawn in the formed blank space (region around the point P that is not overlapped with the changed image elements) into a group (groups). Then, the control section 11 checks as to whether the groups subjected to the shape changing process for forming the blank space and the group(s) of the image elements drawn in the blank space are overlapped with each other in a similar manner to the above-mentioned process S4.

Figure 8B:
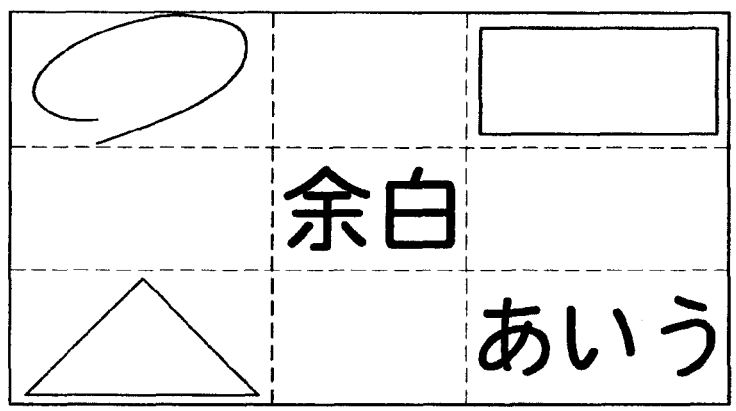

When the groups subjected to the shape changing process and the group(s) of the image elements drawn in the blank space are not overlapped with each other, the control section 11 may select the groups subjected to the shape changing process sequentially as a group in question and enlarge the group in question until the group in question is in contact with groups (including the group(s) of the image elements drawn in the blank space) other than the group in question. The enlargement process is performed by a predetermined enlargement step, and is performed while sequentially selecting the groups subjected to the shape changing process as the group until a group not contacting with the other groups is not left (FIG. 8B). In FIG. 8B, the circumscribed rectangles of the groups are virtually indicated by dotted lines. In this case, the enlarged image elements may be overwritten in the storage section 12.

Figure 8C:
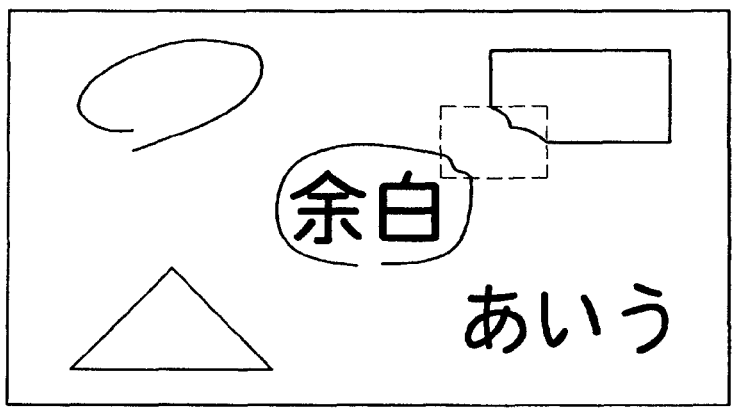

Also, when the groups subjected to the shape changing process and the group(s) of the image elements drawn in the blank space are partially overlapped with each other, the reducing process may be performed for a overlapping part of any of the groups involved in the overlapping state (FIG. 8C). FIG. 8C shows an example in which, fox each overlapping group, a reducing ratio for an overlapping part between the circumscribed rectangles gradually increases along a direction toward a center of the other group involved in the overlapping state (inside the dotted line).

In the example shown in FIG. 8C, the reduction ratio for the overlapping part between the circumscribed rectangles is changed. Specifically, a reduction ratio Ri for an image element i may be in proportional to a distance l to the center of the counterpart rectangle (e.g., $Ri=c \times l$; c denotes constant).

Although it has been described in the above-mentioned example that a user specifies a substantially center portion of a display region of the display section, which is the drawings space, as the blank-space forming position, the user may specify the blank-space forming position, for example, in the left end portion or the upper end portion of the drawing space.

Figure 9:
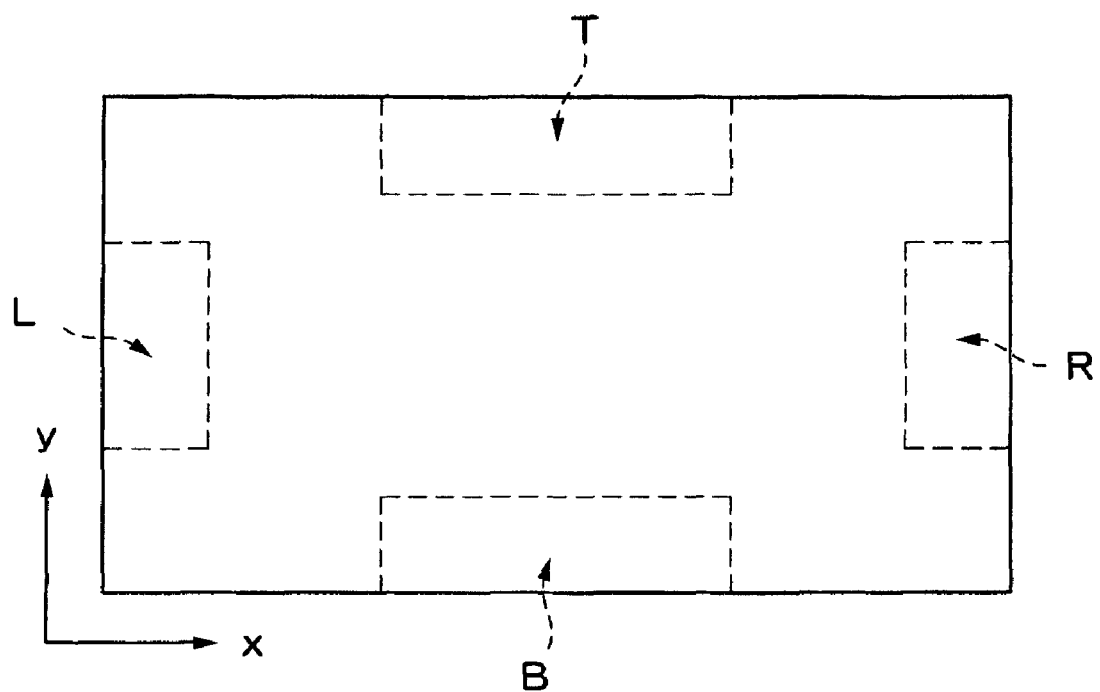
FIG. 9 is an explanatory diagram illustrating an example of segmented regions that are set in a drawing region, in the image processing apparatus according to the exemplary embodiment of the invention.

When the command to form the blank portion is given for a peripheral portion of the drawing space, the moving or reducing of groups may be limited to the x axis direction or the y axis direction. For example, as shown in FIG. 9, the whole drawing space may be divided into five portions of a left-end central portion (L), an upper-end central portion (T), a right-end central portion (R), a lower-end central portion (B), and the other portion. It may be determined in advance what axis directions the moving or reducing of groups is performed along when the command to forming the blank space is given for the respective segmented portions.

For example, when the command to from the blank space is given for the left-end central portion (L) or the right-end central portion (R), the moving or reducing of groups may be performed only in the x axis direction. When the command to form the blank space is given for the top-end central portion (T) or the bottom-end central portion (B), the moving or reducing of groups may be performed only in the y axis direction. In the other cases, the moving or reducing of groups may be performed in both the x axis direction and the y axis direction. In this way, when the axis directions for the moving or reducing are limited, a position and a size in the axis direction in question of a group, which is a shape-changing target, are changed in accordance with a predetermined moving distance and a predetermined reduction ratio.

Figure 10A:
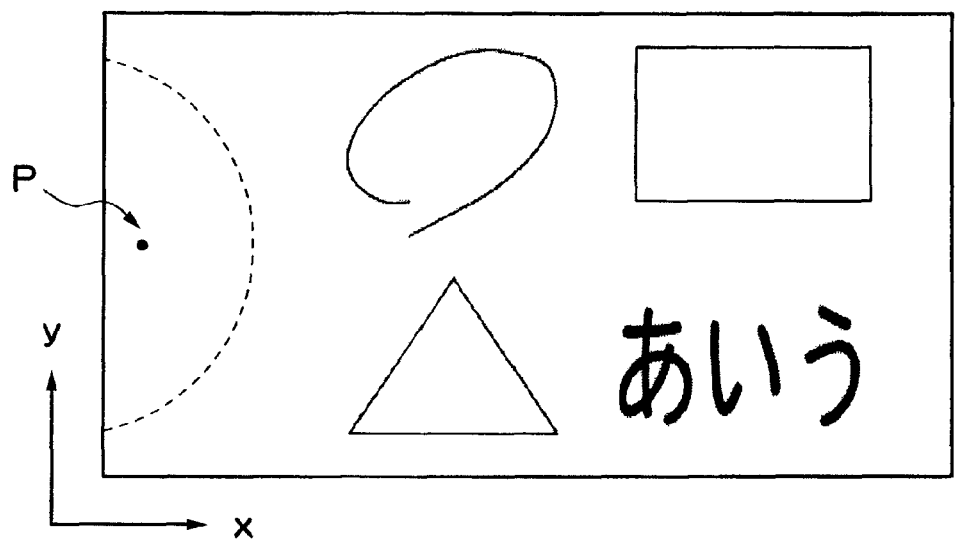
FIG. 10 is an explanatory diagram illustrating still another operation example of the image processing apparatus according to the exemplary embodiment of the invention.
Figure 10B:
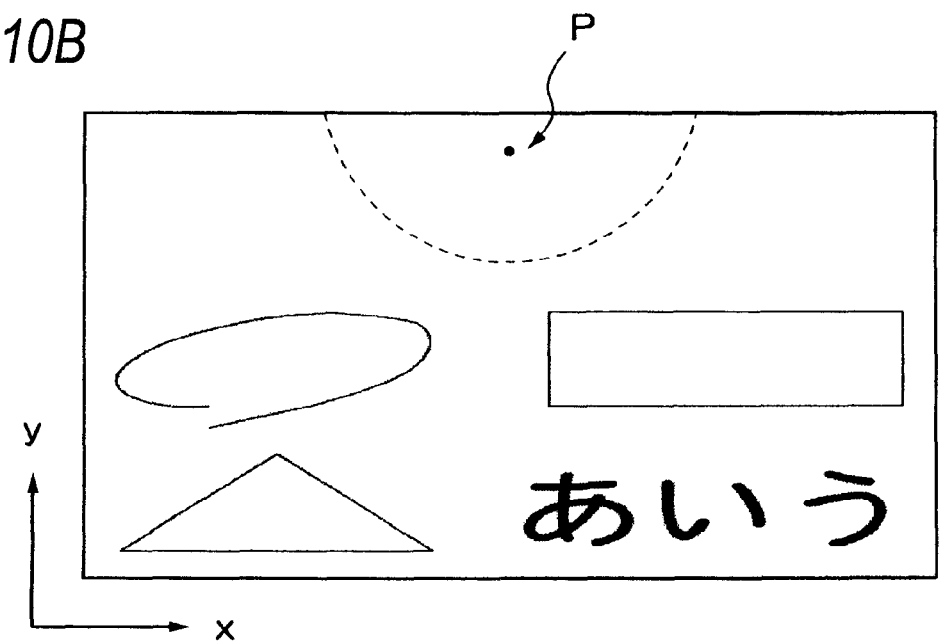

For example, FIGS. 10A and 10B show results corresponding to FIG. 7A when the command to form the blank space is given for the left-end central portion (L) and when the command to form the blank space is given for the top end central portion (T), respectively.

Figure 11:
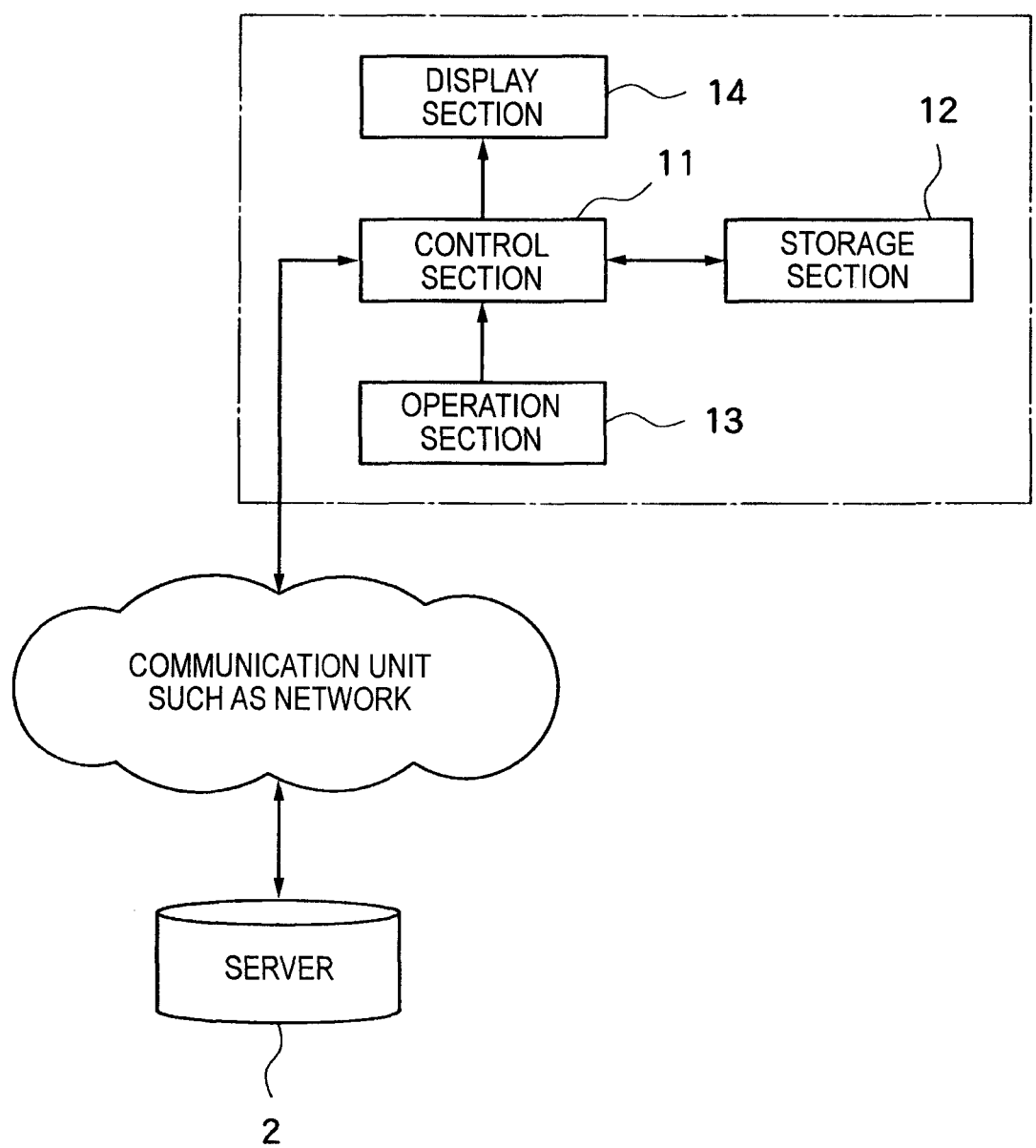
FIG. 11 is a configuration block diagram illustrating an image processing system according to the exemplary embodiment of the invention.

Although it has been described above that the image elements to be drawn in the drawing space are stored in the storage section 12 together with the information indicating the drawing times, the invention is not limited thereto. For example, as shown in FIG. 11, the image processing apparatus according to this exemplary embodiment may be connected to a server 2 as an information storage connected through a communication unit such as a network. Also, the information (information exemplified in FIG. 2) of the image elements to be drawn may be stored in the server 2.

In this case, the image processing apparatus according to this exemplary embodiment may perform a process of storing, in the server 2, information of the image elements subjected to the shape changing process in units of groups.

What is claimed is:

1. A non-transitory computer-readable medium storing a program that causes a computer to execute image processing, the image processing comprising:

drawing a first image element within a drawing space, the first image element drawn at a first coordinate position within a coordinate system of the drawing space;

drawing a second image element within the drawing space, the second image element drawn at a second coordinate position within the coordinate system of the drawing space;

receiving a command to form a blank space within the drawing space, the blank space comprising a portion of the drawing space within which no image elements are drawn, and the command comprising a blank-space forming position that indicates a third coordinate position within the coordinate system of the drawing space at which the blank space is to be formed within the drawing space;

calculating (i) a first new coordinate position of the first image element that does not overlap with the blank-space forming position based on the first coordinate position and the blank-space forming position and (ii) a second new coordinate position of the second image element that does not overlap with the blank-space forming position based on the second coordinate position and the blank-space forming position;

displaying within the drawing space the first image element at the first new coordinate position, the second image element at the second new coordinate position, and the blank space at the blank-space forming position, wherein the calculating comprises:

determining a first center position of the first image element based on the first coordinate position and a second center position of the second image element based on the second coordinate position;

calculating an average center position of the first center position and the second center position, based on the determined first center position and the second center position;

determining a scaling parameter for scaling the average center position;

scaling a difference between the average center position and the blank-space forming position by the scaling parameter;

determining a new average center position as a sum of the scaled difference and the average center position;

calculating a vector difference that is a difference between the new average center position and the average center position; and calculating (i) the first new coordinate position of the first image element as a first sum of the first coordinate position and the vector difference and (ii) the second new coordinate position of the second image element as a second sum of the second coordinate position and the vector difference.

2. A non-transitory computer-readable medium storing a program that causes a computer to execute image processing, the image processing comprising:

drawing a first image element within a drawing space, the first image element drawn at a first coordinate position within a coordinate system of the drawing space;

drawing a second image element within the drawing space, the second image element drawn at a second coordinate position within the coordinate system of the drawing space;

receiving a command to form a blank space within the drawing space, the blank space comprising a portion of the drawing space within which no image elements are drawn, and the command comprising a blank-space forming position that indicates a third coordinate position within the coordinate system of the drawing space at which the blank space is to be formed within the drawing space;

calculating (i) a first new coordinate position of the first image element that does not overlap with the blank-space forming position based on the first coordinate position and the blank-space forming position and (ii) a second new coordinate position of the second image element that does not overlap with the blank-space forming position based on the second coordinate position and the blank-space forming position;

displaying within the drawing space the first image element at the first new coordinate position, the second image element at the second new coordinate position, and the blank space at the blank-space forming position, wherein the calculating comprises:

determining a vertex coordinate among coordinates of the first image element and the second image element that is most apart from the blank-space forming position based on the first coordinate position and the second coordinate position;

determining a scaling parameter for scaling the first image element and the second image element;

scaling the first coordinate position and the second coordinate position towards the vertex coordinate by the scaling parameter; and calculating (i) the first new coordinate position of the first image element as the scaled first coordinate position and (ii) the second new coordinate position of the second image element as the scaled second coordinate position.

3. An image processing apparatus comprising:

a processor that controls the image processing apparatus to function as:

an image element drawing unit that draws a first image element within a drawing space, the first image element drawn at a first coordinate position within a coordinate system of the drawing space, and that draws a second image element within the drawing space, the second image element drawn at a second coordinate position within the coordinate system of the drawing space;

a receiving unit that receives a command to form a blank space within the drawing space, the blank space comprising a portion of the drawing space within which no image elements are drawn, and the command comprising a blank-space forming position that indicates a third coordinate position within the coordinate system of the drawing space at which the blank space is to be formed within the drawing space; and a shape changing unit that calculates (i) a first new coordinate position of the first image element that does not overlap with the blank-space forming position based on the first coordinate position and the blank-space forming position and (ii) a second new coordinate position of the second image element that does not overlap with the blank-space forming position based on the second coordinate position and the blank-space forming position; and a display that displays within the drawing space the first image element at the first new coordinate position, the second image element at the second new coordinate position, and the blank space at the blank-space forming position, wherein the calculating performed by the shape changing unit comprises:

determining a first center position of the first image element based on the first coordinate position and a second center position of the second image element based on the second coordinate position;

calculating an average center position of the first center position and the second center position, based on the determined first center position and the second center position;

determining a scaling parameter for scaling the average center position;

scaling a difference between the average center position and the blank-space forming position by the scaling parameter;

determining a new average center position as a sum of the scaled difference and the average center position;

calculating a vector difference that is a difference between the new average center position and the average center position; and calculating (i) the first new coordinate position of the first image element as a first sum of the first coordinate position and the vector difference and (ii) the second new coordinate position of the second image element as a second sum of the second coordinate position and the vector difference.

4. An image processing apparatus comprising:

a processor that controls the image processing apparatus to function as:

an image element drawing unit that draws a first image element within a drawing space, the first image element drawn at a first coordinate position within a coordinate system of the drawing space, and that draws a second image element within the drawing space, the second image element drawn at a second coordinate position within the coordinate system of the drawing space;

a receiving unit that receives a command to form a blank space within the drawing space, the blank space comprising a portion of the drawing space within which no image elements are drawn, and the command comprising a blank-space forming position that indicates a third coordinate position within the coordinate system of the drawing space at which the blank space is to be formed within the drawing space; and a shape changing unit that calculates (i) a first new coordinate position of the first image element that does not overlap with the blank-space forming position based on the first coordinate position and the blank-space forming position and (ii) a second new coordinate position of the second image element that does not overlap with the blank-space forming position based on the second coordinate position and the blank-space forming position; and a display that displays within the drawing space the first image element at the first new coordinate position, the second image element at the second new coordinate position, and the blank space at the blank-space forming position, wherein the calculating performed by the shape changing unit comprises:

determining a vertex coordinate among coordinates of the first image element and the second image element that is most apart from the blank-space forming position based on the first coordinate position and the second coordinate position;

determining a scaling parameter for scaling the first image element and the second image element;

scaling the first coordinate position and the second coordinate position towards the vertex coordinate by the scaling parameter; and calculating (i) the first new coordinate position of the first image element as the scaled first coordinate position and (ii) the second new coordinate position of the second image element as the scaled second coordinate position.

* * * * *